(12) United States Patent
Beattie, Jr. et al.

(10) Patent No.: US 8,036,132 B1
(45) Date of Patent: Oct. 11, 2011

(54) SYSTEMS, DEVICES, AND METHODS FOR DETERMINING NETWORK FAILURES

(75) Inventors: James Beattie, Jr., Bergenfield, NJ (US); Chuan-Chuen Chang, Holmdel, NJ (US); Stephen Griesmer, Westfield, NJ (US); David Stockton, Bailey, CO (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 638 days.

(21) Appl. No.: 11/703,009

(22) Filed: Feb. 6, 2007

(51) Int. Cl.
*H04L 12/26* (2006.01)

(52) U.S. Cl. ............... 370/242; 714/100; 714/1; 714/2; 714/3; 714/4.1

(58) Field of Classification Search .......... 370/216–228, 370/241–253; 714/100, 1–4, 25–29, 699, 714/712
See application file for complete search history.

(56) References Cited

U.S. PATENT DOCUMENTS

| | | | |
|---|---|---|---|
| 5,313,453 A | 5/1994 | Uchida | |
| 5,477,531 A | 12/1995 | McKee | |
| 5,668,800 A * | 9/1997 | Stevenson | 370/248 |
| 5,710,760 A | 1/1998 | Moll | |
| 6,292,495 B1 | 9/2001 | Von Hammerstein | |
| 6,463,037 B1 | 10/2002 | Ooyoshi | |
| 6,466,548 B1 * | 10/2002 | Fitzgerald | 370/249 |
| 7,047,459 B2 | 5/2006 | Chuah | |
| 7,133,367 B2 | 11/2006 | Powers | |
| 7,466,655 B1 * | 12/2008 | Zhao | 370/238 |
| 2004/0114523 A1 | 6/2004 | Taylor | |
| 2004/0114528 A1 | 6/2004 | Taylor | |
| 2004/0117475 A1 | 6/2004 | Taylor | |
| 2005/0147107 A1 * | 7/2005 | Powers et al. | 370/397 |
| 2005/0198381 A1 * | 9/2005 | Rorie | 709/239 |
| 2006/0067237 A1 | 3/2006 | Burns | |
| 2006/0092850 A1 * | 5/2006 | Neidhardt et al. | 370/252 |
| 2007/0299622 A1 * | 12/2007 | Smith et al. | 702/90 |
| 2008/0019282 A1 * | 1/2008 | Alaria et al. | 370/252 |

* cited by examiner

*Primary Examiner* — Hassan Kizou
*Assistant Examiner* — Charles Jiang
(74) *Attorney, Agent, or Firm* — Guntin Meles & Gust, PLC; Andrew Gust (57) ABSTRACT

Certain exemplary embodiments comprise a method, which can comprise automatically generating a trouble ticket responsive to a determined failure of one or more elements of a management Permanent Virtual Circuit (PVC). The management PVC can be established between a signaling device and a device communicatively coupled to a backbone network.

20 Claims, 2 Drawing Sheets

SYSTEMS, DEVICES, AND METHODS FOR DETERMINING NETWORK FAILURES

BACKGROUND

United States Patent Publication No. 20060067237 (Burns), which is incorporated by reference herein in its entirety, allegedly discloses a "novel method and system for testing network connections is provided. In an embodiment, the system includes a network, such as the Internet, which is connected to subscriber devices in a subscriber site via an service provider, a gateway in a telephone company central office, and a DSLAM in an open plant interface. The system also includes a test apparatus operable to inject itself in the connection between the subscriber devices and the Internet at the gateway. The test apparatus can mimic the service provider and, thereby connect directly with the device at the subscriber site and try to test network connections for issue between the service provider and the device. The test apparatus can also mimic the customer and, thereby connect directly with the device and the test network connections between the service provider and the device." See Abstract.

United States Patent Publication No. 20040117475 (Taylor), which is incorporated by reference herein in its entirety, allegedly discloses, "[s]ystems and methods for obtaining logical layer information in a frame relay and/or asynchronous transfer mode (ATM) network are described. In an exemplary embodiment, a physical layer test system, such as an integrated testing and analysis system, communicates with a broadband network management system, which in turn communicates with an element management system for a frame relay and/or ATM network." See Abstract.

U.S. Pat. No. 7,133,367 (Powers), which is incorporated by reference herein in its entirety, allegedly discloses the "present invention relates to a method and apparatus for testing components in ATM networks utilizing loop-back based ATM layer testing. The method and apparatus utilize interfaces and identifier codes to send and loop-back test cells along portions of virtual channels to test the virtual channels." See Abstract.

U.S. Pat. No. 7,047,459 (Chuah), which is incorporated by reference herein in its entirety, allegedly discloses the "present invention provides system and method of identifying a failure location in any datapath in a set of datapaths in a communication element, each datapath of the set of datapaths traversing from an ingress point through at least a first component to an egress point. In an embodiment, the method comprises: providing a diagnostic cell adapted to be inserted at a starting point upstream of the first component in the any datapath; providing at least a first diagnostic cell counter module adapted to be associated with a first location in the first component, the first diagnostic cell counter module adapted to recognize when the diagnostic cell passes the first location and adapted to track passage of the diagnostic cell past the first location; inserting the diagnostic cell into the any datapath at the starting point; and analyzing the diagnostic cell counter module to identify the failure location in the any datapath." See Abstract.

SUMMARY

Certain exemplary embodiments comprise a method, which can comprise automatically generating a trouble ticket responsive to a determined failure of one or more elements of a management Permanent Virtual Circuit (PVC). The management PVC can be established between a signaling device and a device communicatively coupled to a backbone network.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments provide a method, which can comprise automatically generating a trouble ticket responsive to a determined failure of one or more elements of a management Permanent Virtual Circuit (PVC). When used herein, the phrase determine means to obtain, calculate, decide, deduce, establish, and/or ascertain. The management PVC can be established between a signaling device and a device communicatively coupled to a backbone network. When used herein, the phrase establish means to create, form, and/or set-up. When used herein, the phrase communicatively couple means to link in a manner that facilitates communications.

In a standard denoted as OSI 7498, the International Organization for Standardization (ISO) defined an Open Systems Interconnection (OSI) Model. When used herein, the phrase define means to establish the meaning, relationship, outline, form, and/or structure of; and/or to precisely and/or distinctly describe and/or specify. The OSI model is a layered, abstract description for communications and computer network protocol design. When used herein, the phrase for means with a purpose of. The OSI model comprises seven defined layers. When used herein, the phrase a means at least one. When used herein, the phrase comprise means to include but not be limited to, what follows.

Layer 1 of the OSI model can be denoted as a Physical Layer. When used herein, the phrase can means is capable of, in at least some embodiments. The Physical layer can define electrical and/or physical specifications for devices. When used herein, the phrase device means a machine, manufacture, and/or collection thereof. When used herein, the phrase and/or means either in conjunction with or in alternative to. Specifications can comprise a layout of pins, voltages, and/or cable specifications, etc. Physical-layer devices can comprise hubs, repeaters, network adapters, and/or Host Bus Adapters (HBAs used in Storage Area Networks) etc. Functions and services performed by the physical layer can comprise:
- establishment and termination of a connection to a communications medium,
- participation in one or more processes whereby communication resources are shared among multiple users, such as contention resolution and/or flow control; and/or
- modulation, or conversion between representations of digital data in user equipment and corresponding signals transmitted over a communications channel, which can be signals operating over the physical cabling (such as copper and fiber optic) or over a radio link.

Various physical-layer Ethernet standards can be comprised in layer 1 of the OSI model.

Layer 2 of the OSI model can be denoted as a Data Link Layer. When used herein, the phrase Layer 2 means a data link layer of the OSI reference model, which is defined in ITU X.200, that is responsible for moving data across physical links in a network. When used herein, the phrase network means a communicatively coupled plurality of nodes, communication devices, and/or information devices. When used herein, the phrase plurality means the state of being plural and/or more than one. When used herein, the phrase responsible means accountable, potentially via legal, contractual, and/or another form of agreement. When used herein, the phrase via means by way of and/or utilizing.

Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof.

When used herein, the phrase service provider means an entity other than an entity that offers to provide a service via a network. When used herein, the phrase not means a negation of something. When used herein, the phrase one means a single entity. When used herein, the phrase provider means an entity supplying communication services. When used herein, the phrase route means a path along which information, such as packets, can be sent. When used herein, the phrase router means a device adapted to direct traffic and/or determine the next network point to which a data packet should be forwarded enroute toward its destination. The router is connected to at least two networks and determines which way to send each data packet based on its current understanding of the state of the networks it is connected to. When used herein, the phrase send means to convey. Routers create or maintain a table of the available routes and use this information to determine the best route for a given data packet. Examples include a router, route-reflector, route server, server-based router, router-switch, sets of routers, and/or intra-networking devices, etc. A typical router operates at least at the bottom 3 layers (Physical, Link, and Network layers) of the OSI model. When used herein, the phrase traffic means a flow of bits, packets, datagrams, calls, and/or messages.

When used herein, the phrase memory device means an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein. When used herein, the phrase processor means a hardware, firmware, and/or software machine and/or virtual machine comprising a set of machine-readable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). When used herein, the phrase utilize means to use and/or put into service. In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller. When used herein, the phrase store means to place, hold, retain, enter, and/or copy into and/or onto a machine-readable medium.

When used herein, the phrase link means a physical and/or logical communication channel between a pair of switching and/or routing devices; and/or an activateable connection to another web page, location in a web page, file, and/or other Internet resource. When used herein, the phrase location means a place. When used herein, the phrase logical means a sequential placement relative to other elements and/or identification of that sequential placement. When used herein, the phrase other means a different and/or distinct entity.

Layer 2 can provide functional and procedural means to transfer data between network entities and to detect and possibly correct errors that may occur in Layer 1. When used herein, the phrase provide means to furnish, supply, give, convey, send, and/or make available. When used herein, the phrase may means is allowed and/or permitted to, in at least some embodiments. When used herein, the phrase occur means to take place. When used herein, the phrase data means information represented in a form suitable for processing by an information device. When used herein, the phrase between means in a separating interval and/or intermediate to. Exemplary data link protocols can comprise Ethernet, High-Level Data Link Control (HDLC), Advanced Data Communication Control Procedures (ADCCP), and/or Aloha, etc. For certain exemplary networks, such as Institute of Electrical and Electronics Engineers (IEEE) 802 local area networks and/or certain non-IEEE 802 networks such as Fiber-Distributed Data Interface (FDDI), layer 2 may be split into a Media Access Control (MAC) layer and an IEEE 802.2 Logical Link Control (LLC) layer. Layer 2 can be adapted to arrange bits from layer 1 into logical chunks of data, known as frames. When used herein, the phrase adapted to means suitable, fit, and/or capable of performing a specified function. When used herein, the phrase from means used to indicate a source. Bridges and/or switches can operate at layer 2. Certain exemplary networking standards can incorporate both layer 1 and layer 2, such as Ethernet, Token ring, FDDI, IEEE 802.11, Bluetooth, and/or IEEE 802.15.4, etc.

Remaining layers of the OSI model can be denoted as:
layer 3—networking layer;
layer 4—transport layer;
layer 5—session layer;

layer 6—presentation layer; and layer 7—application layer.

Certain exemplary embodiments can provide timing data used for Layer 2 packet latency and packet loss monitoring to identify a location of T-3 and/or other layer 1 loopbacks, which might be raised in error. When used herein, the phrase identify means to recognize and/or detect. When used herein, the phrase monitor means to observe. When used herein, the phrase more means greater. When used herein, the phrase packet means a generic term for a bundle of data organized in a specific way for transmission, such as within and/or across a network, such as a digital packet-switching network, and comprising the data to be transmitted and certain control information, such as a destination address. When used herein, the phrase transmit means to provide, furnish, supply, send as a signal, and/or to convey (e.g., force, energy, and/or information) from one place and/or thing to another.

By measuring delays of test signals over predetermined links, a profile of T-3 or other access links can be developed, which can identify round-trip delay to inter-carrier boundary points in a transmission path where loopbacks are most likely to occur and/or to be bound. When used herein, the phrase measure means (n) a quantity ascertained by comparison with a standard. (v) to physically sense, and/or determine a value and/or quantity of something relative to a standard. When used herein, the phrase delay means v. to cause and/or experience an elapsed time between two states and/or events. When used herein, the phrase time means a measurement of a point in a nonspatial continuum in which events occur in apparently irreversible succession from the past through the present to the future. When used herein, the phrase access means (v) to enter, approach, communicate with and/or through, make use of, and/or pass to and/or from; (n) a permission, liberty, right, means, or ability to enter, approach, communicate with and/or through, make use of, and/or pass to and/or from a place, thing, and/or person. When used herein, the phrase predetermined means established in advance. When used herein, the phrase profile means a representation, outline, and/or description of an object, structure, and/or surface.

When used herein, the phrase signal means information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

In certain exemplary embodiments, connectivity between Asynchronous Transfer Mode (ATM) or Frame Relay (FR) switches and a provider/partner's Digital Subscriber Line (DSL) Access Module (DSLAM) can become "looped back" causing outages. Such conditions can last for a period of hours to as long as a week as a service provider entity works through a troubleshooting process with one or more intermediate carrier networks' network management teams. These long periods of isolation can cause DSL customers of the service provider to be isolated and can be communicatively decoupled from the service provider until the loopback condition is removed. When used herein, the phrase cause means to bring about, provoke, precipitate, produce, elicit, be the reason for, result in, and/or effect. When used herein, the phrase customer means a potential and/or actual purchaser of goods and/or services.

Certain exemplary embodiments can assign responsibility for errant loopbacks. By measuring loopback delays across links during scheduled maintenance windows, or prior to installation, a profile of T-3 and/or other access links can identify round-trip delays to inter-carrier boundary points in the transmission path where loopbacks are most likely to occur and/or to be bound. Once such points have been identified, when a loopback appears, the service provider can contact an appropriate carrier and directly focus attention on repairing the loopback. A resultant reduction can result in a time to repair the loopback, which can reduce a customer's outage time, improve customer satisfaction, and/or reduce service provider costs. In certain exemplary embodiments, the service provider can request that a vendor/partner provide a loopback port on the DSLAM through which an exemplary system can measure round-trip data to determine packet delay and/or packet loss. When used herein, the phrase port means an interface via which data are sent and received. When used herein, the phrase receive means to gather, take, acquire, obtain, accept, get, and/or have bestowed upon. When used herein, the phrase request means (v.) to express a need and/or desire for; to inquire and/or ask for. (n.) that which communicates an expression of desire and/or that which is asked for. When used herein, the phrase system means a collection of mechanisms, devices, data, and/or instructions, the collection designed to perform one or more specific functions.

Certain exemplary embodiments can utilize a Layer 2 network performance monitoring tool, to provide a transport "fault-locate" function with a transport alarm. When used herein, the phrase tool means something used to accomplish a task. In certain exemplary embodiments, a Layer 2 packet tool can provide a Layer 1 transport network monitoring function. Certain exemplary embodiments can result in a logical extension of a service provider's network "edge", which when extended can to comprise a DSL vendor/partner's DSL service platform. When used herein, the phrase when means at a time. By using a Layer 2 packet network performance monitoring tool to provide a Layer 1 network monitoring function, a network can be made more reliable and/or less expensive to maintain.

Figure 1:
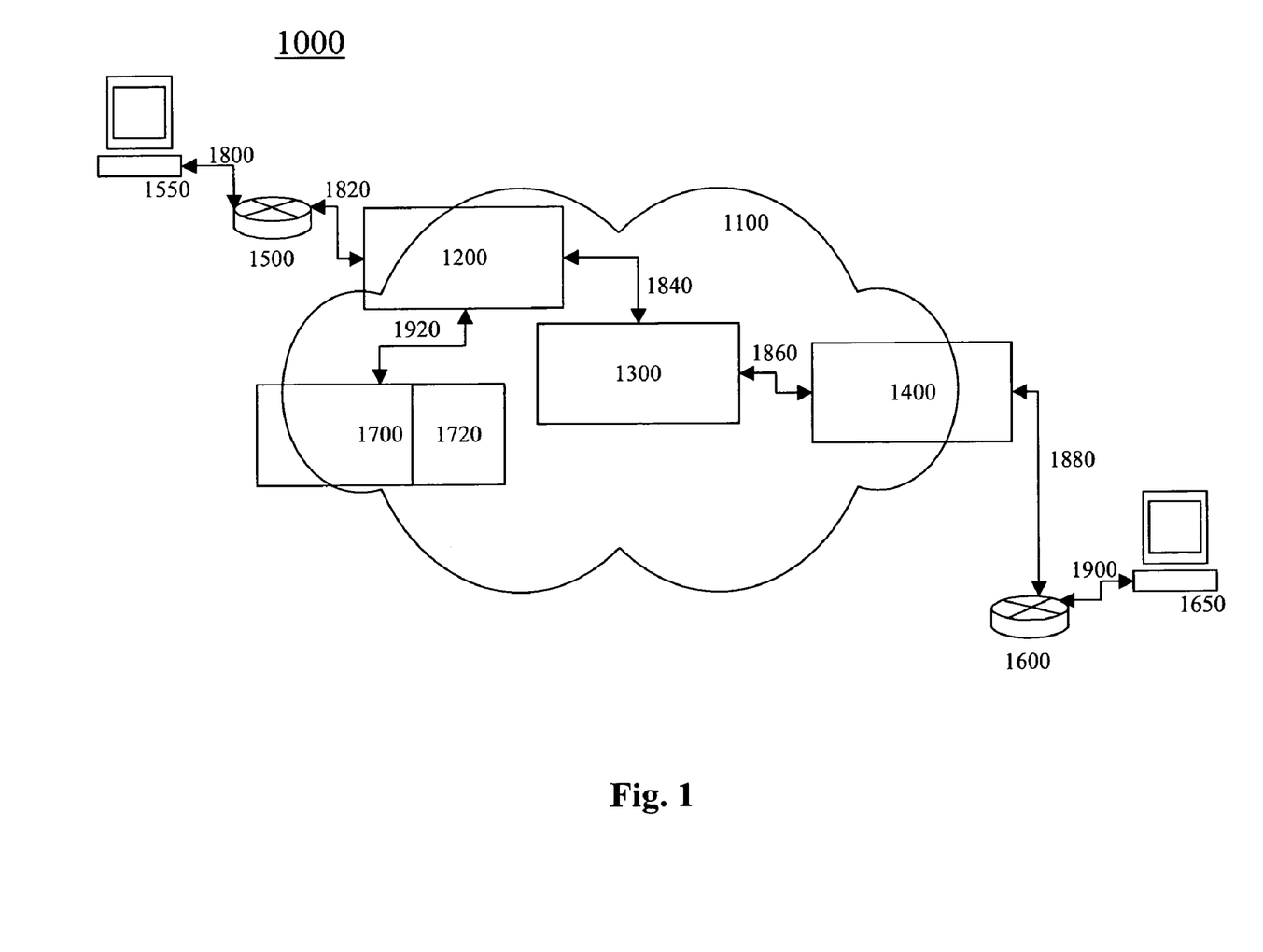
FIG. 1 is a block diagram of an exemplary embodiment of a system 1000.

FIG. 1 is a block diagram of an exemplary embodiment of a system 1000, which can comprise a network 1100. Network 1100 can be a backbone network, which can be adapted to communicatively couple a plurality of network devices and/or information devices. When used herein, the phrase couple means to join, connect, and/or link two things together. Network 1100 can comprise a plurality of devices, such as a first network edge device 1200 and/or a second network edge device 1400. When used herein, the phrase second means following a first thing in an ordering. When used herein, the phrase first means before one or more other things in an ordering. First network edge device 1200 and second network edge device 1400 can be communicatively coupled via one or more intermediate network devices such as intermediate network device 1300 and a plurality of links such as link 1840 and link 1860. Devices such as first network edge device 1200, intermediate network device 1300, and second network edge device 1400 can be a router, bridge, gateway, switch, and/or hub, etc.

When used herein, the phrase information device means any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc. When used herein, the phrase network interface means any physical and/or logical device, system, and/or process capable of coupling an information device to a network. Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device.

When used herein, the phrase input/output (I/O) device means any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected. When used herein, the phrase interface means (n) a boundary across which two independent systems, and/or one system acting as two or more independent systems, meet and act on and/or communicate with each other. When used herein, the phrase Layer 1 means a physical layer of the OSI reference model, which is defined in ITU X.200, that is responsible for an electric signal being sent and received.

When used herein, the phrase user interface means a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

When used herein, the phrase haptic means both the human sense of kinesthetic movement and the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

When used herein, the phrase machine instructions means directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software. When used herein, the phrase machine-readable medium means a physical structure from which a machine, such as an information device, computer, microprocessor, and/or controller, etc., can obtain and/or store data, information, and/or instructions. When used herein, the phrase obtain means to receive, get, take possession of, procure, acquire, calculate, determine, and/or compute. Examples include memories, punch cards, and/or optically readable forms, etc.

System 1000 is presented in a simplistic form for clarity of illustration. Certain exemplary embodiments can comprise a much larger and architecturally complex mesh network comprising any number of devices, links, and/or complex interconnections.

First network edge device 1200 can be communicatively coupled to a first customer edge device 1500. First customer edge device 1500 can be adapted to communicatively couple a first customer information device 1550, which can be a node on a first customer network (not shown), to network 1100 via a plurality of links, such as link 1800 and link 1820.

Second network edge device 1400 can be communicatively coupled to a second customer edge device 1600. Second customer edge device 1600 can be adapted to communicatively couple a second customer information device 1650, which can be a node on a second customer network (not shown), to network 1100 via a plurality of links, such as link 1880 and link 1900.

In certain exemplary embodiments, first customer information device 1550 can be communicatively coupled to second customer information device 1650 via a production Permanent Virtual Circuit (PVC). When used herein, the phrase permanent virtual circuit (PVC) means a dedicated and automatically switched communications arrangement in which data from a source device can be passed to a destination device over more than one real communications circuits during a single period of communication. Such an exemplary production PVC can comprise link 1800, first customer edge device 1500, link 1820, first network edge device 1200, link 1840, intermediate network device 1300, link 1860, second network edge device 1400, link 1880, second customer edge device 1600, and/or link 1900. Link 1800, link 1820, link 1840, link 1860, link 1880, and/or link 1900 can comprise paired fiber optic cables, each cable adapted to carry unidirectional data traffic. When used herein, the phrase each means every one of a group considered individually.

System 1000 can comprise a signaling device 1700, which can be adapted to transmit loopback signals. When used herein, the phrase signaling means sending a message to. Loopback signals can be adapted to request a response from one or more devices along a path via which the loopback signals are transmitted. Signaling device 1700 can be a sole signaling device associated with network 1100; When used herein, the phrase associated with means related to. In certain exemplary embodiments, signaling device 1700 can be one of a plurality of signaling devices associated with network 1100.

Signaling device 1700 can be adapted to test the production PVC. For example, signaling device 1700 can be adapted to transmit loopback signals via a first management PVC that comprises link 1920, first network edge device 1200, link 1840, intermediate network device 1300, link 1860, second network edge device 1400, link 1880, second customer edge device 1600, link 1900, and/or second information device 1650. The first management PVC can be adapted to test and/or monitor certain links and/or devices of the production PVC. Loopback signals sent via the first management PVC can request a response from first network edge device 1200, intermediate network device 1300, second network edge device 1400, second customer edge device 1600, and/or second information device 1650. By measuring delay times for one or more such loopback signals, a baseline first management PVC circuit delay time can be established for the first management PVC, such as between signaling device 1700 and information device 1650. When used herein, the phrase delay time means an elapsed time between two states and/or events. When used herein, the phrase baseline means a value, sometimes based upon statistical, historical, current, and/or projected values, against which subsequently obtained values can be compared. Based upon the baseline first management PVC circuit delay time, baseline delay times can be established for link 1840, link 1860, link 1880, and/or link 1900. When used herein, the phrase based upon means determined in consideration of and/or derived from. For example, the baseline delay time for link 1900 can be determined by taking a difference between a delay time associated with responses to the loopback signals from second customer edge device 1600 and the baseline first management PVC circuit delay time. In an analogous manner, baseline delay times can be established for link 1840, link 1860, and/or link 1880.

Baseline delay times can be established based upon a single measurement of a single loopback signal and/or upon a statistical analysis of a plurality of loopback signals. For example, baseline delay times can be determined based upon an arithmetic average, moving average, and/or weighted average, etc. of loopback signal measurements.

Signaling device 1700 can be adapted to transmit loopback signals via a second management PVC that comprises link 1920, first network edge device 1200, link 1820, first customer edge device 1500, link 1800, and/or first information device 1550. The second management PVC can be adapted to test and/or monitor certain links and/or devices of the production PVC. Loopback signals sent via the second management PVC can request a response from first network edge device 1200, first customer edge device 1500, and/or first information device 1550. By measuring delay times for one or more such loopback signals, a baseline second management PVC circuit delay time can be established for the second management PVC, such as between signaling device 1700 and information device 1650. Based upon the baseline second management PVC circuit delay time, baseline delay times can be established for link 1820 and/or link 1800. For example, the baseline delay time for link 1800 can be determined by taking a difference between a delay time associated with responses to the loopback signals from first customer edge device 1500 and the baseline second management PVC circuit delay time. In an analogous manner, a baseline delay time can be established for link 1820.

Thus, via signaling device 1700, each and/or any link of the production. PVC can be tested and/or monitored. Once baseline time delays for each and/or any desired link of all or part of the production PVC have been established, loopback signals can be transmitted via any portion of the first management PVC and/or any portion of the second management PVC to monitor links of the production PVC for failures. Failures can be hardware failures, firmware failures, and/or software failures. Exemplary hardware failures can comprise a link (e.g., trunk circuit) failure and/or a device (e.g., router) failure. When used herein, the phrase failure means a cessation of proper functioning or performance. A failure can be determined based upon a measured delay time associated with a link exceeding a baseline delay time determined for the link. A trouble ticket can be automatically generated responsive to a determination of the failure. When used herein, the phrase trouble ticket means a notification requesting a correction of a determined problem. When used herein, the phrase responsive means reacting to an influence and/or impetus. When used herein, the phrase automatically means acting and/or operating in a manner essentially independent of external human influence and/or control. For example, an automatic light switch can turn on upon "seeing" a person in its view, without the person manually operating the light switch. When used herein, the phrase generate means to create, produce, render, give rise to, and/or bring into existence. When used herein, the phrase render means to display, annunciate, speak, print, and/or otherwise make perceptible to a human, for example as data, commands, text, graphics, audio, video, animation, and/or hyperlinks, etc., such as via any visual, audio, and/or haptic means, such as via a display, monitor, printer, electric paper, ocular implant, cochlear implant, speaker, etc.

In certain exemplary embodiments, signaling device 1700 can comprise a trouble ticket processor 1720, which can be adapted to automatically generate a trouble ticket responsive to a determined failure of one or more elements of a management Permanent Virtual Circuit (PVC), such as the first management PVC and/or the second management PVC. When used herein, the phrase management permanent virtual circuit (PVC) means a PVC defined in order to test performance of a production PVC. The management PVC is defined between a testing device and a destination of the production PVC. The management PVC can be adapted to signal and/or test one or more transport network interfaces associated with the production PVC. When used herein, the phrase transport network interface means an addressable device communicatively couplable to an entity (such as a router, server, switch, softswitch, gateway, etc.) to a packet network, the addressable device comprising hardware, firmware, and/or software, etc. The entity can have multiple interfaces, each of which can be addressable via one or more packet networks. The addressable device can be adapted to return a loopback test signal to a source of the loopback test signal.

The second management PVC can be established between signaling device 1700 and a non-service provider connection device, such as first customer edge device 1500, communicatively coupled to network 1100. When used herein, the phrase connection means a physical and/or logical link and/or channel between two or more points in a system. For example, a wire, an optical fiber, a wireless link, and/or a virtual circuit, etc. The first management PVC can comprise a plurality of transport network interfaces, which can comprise interfaces between link 1920 and first network edge device 1200, link 1840 and intermediate network device 1300, link 1860, second network edge device 1400, link 1880 and second customer edge device 1600, link 1900, and/or second customer edge information device 1650. The failure can determined based upon an established profile of round-trip delay times for each of a plurality of access links between the plurality of transport network interface devices.

The profile can comprise baseline round-trip delay times determined based upon loopback test signals transmitted by signaling device 1700. When used herein, the phrase loopback test means a diagnostic test that returns a transmitted signal back to a sending device after the signal has traversed across one or more particular links. When used herein, the phrase particular means of, or associated with, a distinct and/or specific entity, thing, person, group, place, activity, and/or category. The returned signal can then be compared to the transmitted one and/or an elapsed time for traversal of the transmitted signal can be determined. The failure can be determined and/or located via active diagnostic tests. When used herein, the phrase active diagnostics means one or more tests adapted to diagnose and/or locate a fault and/or failure. When used herein, the phrase locate means to identify and/or discover a relative position of.

Heuristic rules can be applied in diagnosing failures within a system such as system 1000. For example, an exemplary system might infer that a loopback signal data loss might not be due to a trunk circuit failure unless the data loss extends for a time period of at least a predetermined trunk circuit failure threshold. When used herein, the phrase trunk means a large-bandwidth telephone channel, of at least 1.5 megabits per second, connecting two service provider switching centers, the channel adapted to handle at least 24 simultaneous voice and/or data signals. When used herein, the phrase at least means not less than. When used herein, the phrase threshold means a point that when exceeded produces a given effect or result. The predetermined trunk circuit failure threshold can be, in minutes, approximately 0.5, 0.68, 0.9, 1.41, 1.875, 2.0, 3.275, 4.9, 7, 8.3, 9.11, 10.0, or any value or sub-range therebetween. Similarly, an exemplary system might infer that a loopback signal data loss might not be due to a router failure unless the data loss extends for a time period of at least a predetermined router failure threshold. The predetermined router failure threshold can be, in minutes, approximately 0.75, 0.98, 1.1, 1.41, 1.875, 2.0, 3.275, 4.9, 7, 8.3, 9.11, 11.6, 15.59, 18.2, 20.0, or any value or sub-range therebetween.

Other heuristic rules can be applied in analyzing system 1000 when a measured delay time is substantially less than an established baseline delay time. When used herein, the phrase substantially means to a considerable, large, and/or great, but not necessarily whole and/or entire, extent and/or degree. When used herein, the phrase less than means having a measurably smaller magnitude and/or degree as compared to something else. When used herein, the phrase analyze means to review, study, examine, evaluate, and/or consider in detail and/or to subject to an analysis in order to discover essential features and/or meaning. Such an occurrence can be associated with a facility loopback. When used herein, the phrase facility loopback means a condition wherein a loopback test signal is returned to a source in an unexpectedly short time period due to a connection that bypasses a portion of an expected path. When used herein, the phrase wherein means in regard to which; and; and/or in addition to. The facility loopback can be caused by a non-service provider entity communicatively coupling one or more network devices and/or devices in a manner not expected by the service provider. Certain exemplary embodiments can be adapted to automatically notify the service provider and/or the non-service provider responsive to a detection of the facility loopback.

Figure 2:
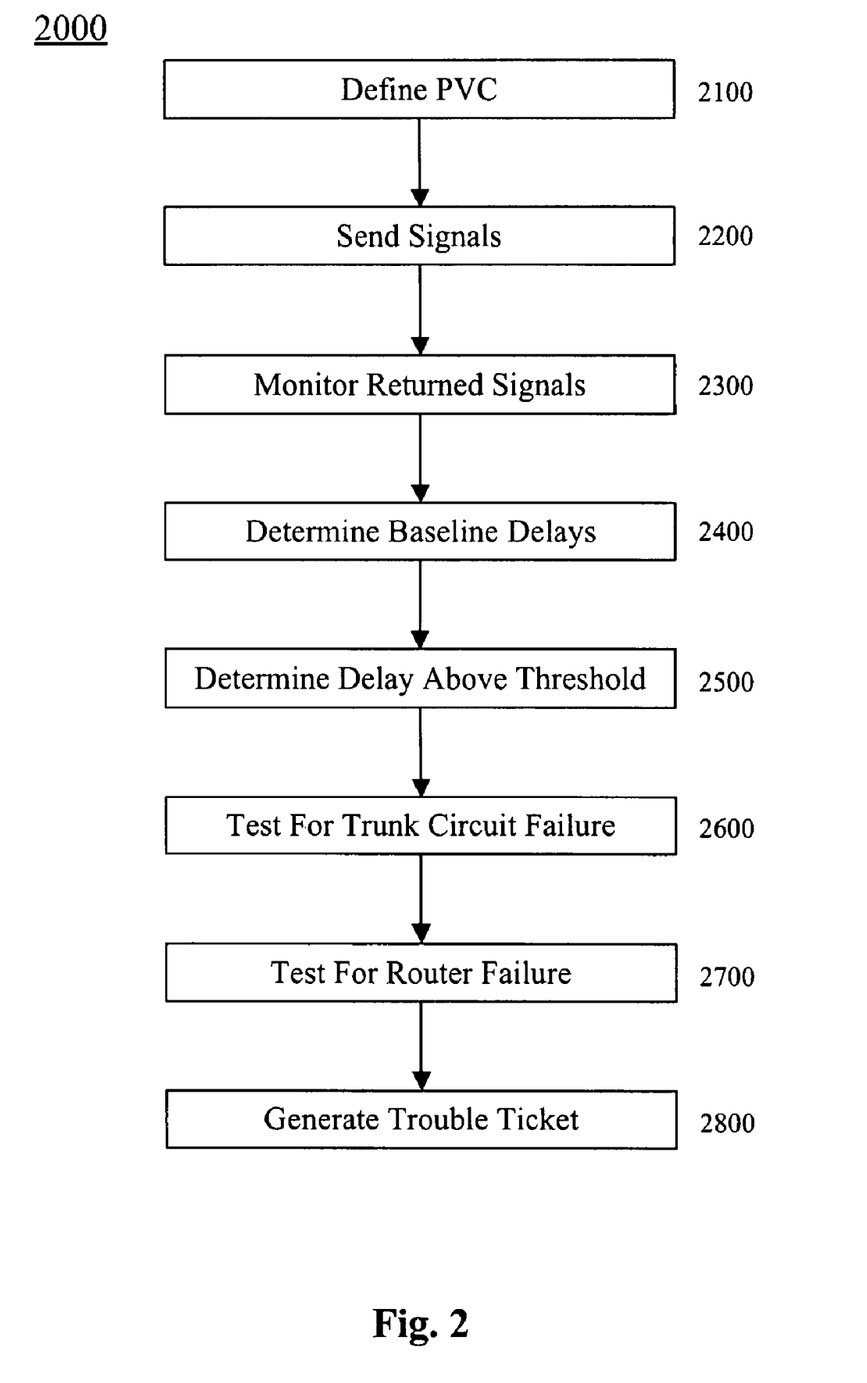
FIG. 2 is a flowchart of an exemplary embodiment of a method 2000.

FIG. 2 is a flowchart of an exemplary embodiment of a method 2000. When used herein, the phrase method means a process, procedure, and/or collection of related activities for accomplishing something. When used herein, the phrase said means when used in a system or device claim, an article indicating a subsequent claim term that has been previously introduced.

At activity 2100, a management PVC can be defined. When used herein, the phrase activity means an action, act, deed, function, step, and/or process and/or a portion thereof. When used herein, the phrase further means in addition. The management PVC can be defined responsive to obtaining access to a loopback port on a device at which a production Permanent Virtual Circuit (PVC) logically terminates relative to the service provider, the device communicatively coupled to a backbone network of the service provider. When used herein, the phrase terminate means to end. When used herein, the phrase backbone network means a "transit" network, often made up of long-distance telephone trunk lines and/or other wired and/or wireless links such as microwave and satellite links, adapted for transmitting large amounts of data simultaneously between host computer systems connected to the Internet. Normal communicated data typically neither originates nor terminates in a backbone network. The connection device can be associated with the service provider or a non-service provider. The production PVC can comprise a plurality of transport network interfaces. The management PVC can be terminated on the loopback port. The management PVC can be established between a signaling device and a non-service provider connection device communicatively coupled to a backbone network of the service provider. The management PVC can comprise a sub-plurality of transport network interfaces, At activity 2200, signals, such as loopback test signals, can be sent from the signaling device, via the management PVC, to a device, such as a router.

At activity 2300, returned signals can be monitored. The loopback test signals can be monitored via a layer 2 tool. The layer 2 tool can be adapted to measure round-trip delay times from the signaling device and each of the plurality of transport network interface devices.

At activity 2400, baseline delays associated with each of two or more links associated with the management PVC can be determined. A profile of one or more links associated with the management PVC can be established, which can comprise a determined baseline round-trip delay times associated with each link of the management PVC. The baseline delays can be determined based upon a statistical analysis of loopback signals transmitted by the signaling device.

At activity 2500, a delay can be determined to be above a predetermined threshold. The predetermined threshold can be a first threshold delay time and/or a second threshold delay time between the signaling device and the non-service provider connection device.

At activity 2600, a test can be conducted to determine that a trunk circuit failure has occurred. In certain exemplary embodiments, a determination can be made, when one or more of the monitored loopback test signals are not delayed beyond the first threshold delay time, that a layer 1 trunk circuit failure has not occurred. When used herein, the phrase beyond means farther along in space, time, and/or degree. In certain exemplary embodiments, active diagnostic tests can be used to determine that a failure is a trunk circuit failure and/or to isolate a location of the trunk circuit failure.

At activity 2700, a test can be conducted to determine that a router failure has occurred. In certain exemplary embodiments, a determination can be made, when one or more of the monitored loopback test signals are not delayed beyond the second threshold delay time, that router failure has not occurred. In certain exemplary embodiments, active diagnostic tests can be used to determine that a failure is a router failure and/or to isolate a location of the router failure.

In certain exemplary embodiments, a facility loopback can be determined and/or identified when one or more of the monitored loopback test signals are delayed substantially less than a baseline round-trip delay between the signaling device and the non-service provider connection device. In certain exemplary embodiments, tests can be run to locate the facility loopback and/or identify a management entity that is responsible for the facility loopback. When used herein, the phrase management entity means a person and/or information device adapted to handle, supervise, control, direct, and/or govern activities associated with a machine.

At activity 2800, a trouble ticket can be automatically generated. The trouble ticket can be adapted to provide a service entity with failure location information regarding the trunk failure, the facility loopback, and/or the router failure. When used herein, the phrase information means facts, terms, concepts, phrases, expressions, commands, numbers, characters, and/or symbols, etc., that are related to a subject. When used herein, the phrase regarding means pertaining to. Sometimes used synonymously with data, and sometimes used to describe organized, transformed, and/or processed data. It is generally possible to automate certain activities involving the management, organization, storage, transformation, communication, and/or presentation of information. The trouble ticket can be automatically generated responsive to a determined failure of one or more elements of the management Permanent Virtual Circuit (PVC). The failure can be determined based upon the established profile of round-trip delay times for each of the plurality of access links between the plurality of transport network interface devices.

When terms defined herein are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

Note

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. When used herein, the phrase modify means to change, cause to change, edit, alter, replace, delete, and/or correct.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, the descriptions and drawings are to be regarded as illustrative in nature, and not as restrictive.

What is claimed is:

1. A method comprising:
    obtaining access to a loopback port terminating a Permanent Virtual Circuit (PVC) on a non-service provider connection device communicatively coupled to a backbone network of a service provider, said PVC comprising a plurality of transport network interfaces;
    defining a management PVC terminated on said loopback port;
    sending loopback test requests from a signaling device via said management PVC, wherein a separate loopback test request of the loopback test requests is transmitted to each of the plurality of transport network interfaces from the signaling device;
    monitoring loopback test signals via a layer 2 tool, the loopback test signals comprising the loopback test requests and a loopback test response, said layer 2 tool adapted to measure round-trip delay times from said signaling device and each of said plurality of transport network interface devices for the loopback test signals;
    via said monitored loopback test signals, identifying baseline round-trip delay times between said signaling device and each of said plurality of transport network interface devices;
    establishing a profile of round-trip delay times for each of a plurality of access links between said plurality of transport network interface devices, said profile comprising said baseline round-trip delay times;
    establishing a first threshold delay time between said signaling device and said non-service provider connection device;
    determining, when one or more of said monitored loopback test signals are not delayed beyond said first threshold delay time, that a layer 1 trunk circuit failure has not occurred;
    establishing a second threshold delay time between said signaling device and said non-service provider connection device;
    determining, when one or more of said monitored loopback test signals are not delayed beyond said second threshold delay time, that a layer 1 router failure has not occurred;
    determining, when one or more of said monitored loopback test signals are delayed substantially less than a baseline round-trip delay between said signaling device and said non-service provider connection device, that a facility loopback exists;
    locating said facility loopback;
    identifying a management entity that is responsible for said facility loopback; responsive to a determination that a trunk circuit failure has occurred, locating said trunk failure via active diagnostics;
    responsive to a determination that a router failure has occurred, locating said router failure via active diagnostics; and
    automatically generating a trouble ticket adapted to provide a service entity with failure location information regarding said trunk failure, said facility loopback, or said router failure.

2. The method of claim 1, wherein the first threshold delay time is based on a weighted average.

3. The method of claim 1, wherein the second threshold delay time is based on a weighted average.

4. The method of claim 1, wherein the first threshold delay time is based on an arithmetic average.

5. The method of claim 1, wherein the second threshold delay time is based on an arithmetic average.

6. The method of claim 1, wherein the first threshold delay time is between 0.5 and 10.0 minutes.

7. The method of claim 1, wherein the second threshold delay time is between 0.75 and 20.0 minutes.

8. A non-transitory computer readable storage medium comprising computer instructions at least for:
    obtaining access to a loopback port terminating a permanent virtual circuit on a non-service provider connection device communicatively coupled to a backbone network of a service provider, said permanent virtual circuit comprising a plurality of transport network interfaces;
    defining a management permanent virtual circuit terminated on said loopback port;
    sending loopback test requests from a signaling device via said management permanent virtual circuit, wherein a separate loopback test request of the loopback test requests is transmitted to each of the plurality of transport network interfaces from the signaling device;
    monitoring loopback test signals via a layer 2 tool, the loopback test signals comprising the loopback test requests and a loopback test response, said layer 2 tool adapted to measure round-trip delay times from said signaling device and each of said plurality of transport network interface devices for the loopback test signals;
    via said monitored loopback test signals, identifying baseline round-trip delay times between said signaling device and each of said plurality of transport network interface devices;
    establishing a profile of round-trip delay times for each of a plurality of access links between said plurality of transport network interface devices, said profile comprising said baseline round-trip delay times;
    establishing a first threshold delay time between said signaling device and said non-service provider connection device;
    determining, when one or more of said monitored loopback test signals are not delayed beyond said first threshold delay time, that a layer 1 trunk circuit failure has not occurred;
    establishing a second threshold delay time between said signaling device and said non-service provider connection device;
    determining, when one or more of said monitored loopback test signals are not delayed beyond said second threshold delay time, that a layer 1 router failure has not occurred;
    determining, when one or more of said monitored loopback test signals are delayed substantially less than a baseline round-trip delay between said signaling device and said non-service provider connection device, that a facility loopback exists;
    locating said facility loopback;
    identifying a management entity that is responsible for said facility loopback; responsive to a determination that a trunk circuit failure has occurred, locating said trunk failure via active diagnostics;
    responsive to a determination that a router failure has occurred, locating said router failure via active diagnostics; and
    automatically generating a trouble ticket adapted to provide a service entity with failure location information regarding said trunk failure, said facility loopback, or said router failure.

9. The non-transitory computer-readable storage medium of claim 8, wherein the first threshold delay time is based on a weighted average.

10. The non-transitory computer-readable storage medium of claim 8, wherein the second threshold delay time is based on a weighted average.

11. The non-transitory computer-readable storage medium of claim 8, wherein the first threshold delay time is based on an arithmetic average.

12. The non-transitory computer-readable storage medium of claim 8, wherein the second threshold delay time is based on an arithmetic average.

13. The non-transitory computer-readable storage medium of claim 8, wherein the first threshold delay time is between 0.5 and 10.0 minutes.

14. The non-transitory computer-readable storage medium of claim 8, wherein the second threshold delay time is between 0.75 and 20.0 minutes.

15. An apparatus comprising:
a memory; and
a controller device coupled with the memory and programmed at least for:
obtaining access to a loopback port terminating a permanent virtual circuit on a non-service provider connection device communicatively coupled to a backbone network of a service provider, said permanent virtual circuit comprising a plurality of transport network interfaces;
defining a management permanent virtual circuit terminated on said loopback port;
sending loopback test requests from a signaling device via said management permanent virtual circuit, wherein a separate loopback test request of the loopback test requests is transmitted to each of the plurality of transport network interfaces from the signaling device;
monitoring loopback test signals via a layer 2 tool, the loopback test signals comprising the loopback test requests and a loopback test response, said layer 2 tool adapted to measure round-trip delay times from said signaling device and each of said plurality of transport network interface devices for the loopback test signals;
via said monitored loopback test signals, identifying baseline round-trip delay times between said signaling device and each of said plurality of transport network interface devices;
establishing a profile of round-trip delay times for each of a plurality of access links between said plurality of transport network interface devices, said profile comprising said baseline round-trip delay times;
establishing a first threshold delay time between said signaling device and said non-service provider connection device;
determining, when one or more of said monitored loopback test signals are not delayed beyond said first threshold delay time, that a layer 1 trunk circuit failure has not occurred;
establishing a second threshold delay time between said signaling device and said non-service provider connection device;
determining, when one or more of said monitored loopback test signals are not delayed beyond said second threshold delay time, that a layer 1 router failure has not occurred;
determining, when one or more of said monitored loopback test signals are delayed substantially less than a baseline round-trip delay between said signaling device and said non-service provider connection device, that a facility loopback exists;
locating said facility loopback;
identifying a management entity that is responsible for said facility loopback; responsive to a determination that a trunk circuit failure has occurred, locating said trunk failure via active diagnostics;
responsive to a determination that a router failure has occurred, locating said router failure via active diagnostics; and
automatically generating a trouble ticket adapted to provide a service entity with failure location information regarding said trunk failure, said facility loopback, or said router failure.

16. The apparatus of claim 15, wherein the first threshold delay time is based on a weighted average.

17. The apparatus of claim 15, wherein the second threshold delay time is based on a weighted average.

18. The apparatus of claim 15, wherein the first threshold delay time is based on an arithmetic average.

19. The apparatus of claim 15, wherein the second threshold delay time is based on an arithmetic average.

20. The apparatus of claim 15, wherein the first threshold delay time is between 0.5 and 10.0 minutes, and wherein the second threshold delay time is between 0.75 and 20.0 minutes.

* * * * *